Jan. 10, 1961 TATSUMI TAKAHASHI 2,967,522
FURNACE FOR CONTINUOUS BURNING
Filed March 14, 1956 5 Sheets-Sheet 2

Inventor
T. Takahashi

United States Patent Office 2,967,522
Patented Jan. 10, 1961

2,967,522
FURNACE FOR CONTINUOUS BURNING
Tatsumi Takahashi, 1631 Oaza-Shiki, Adachi-Machi, Kitaadachi-gun, Saitama-ken, Japan
Filed Mar. 14, 1956, Ser. No. 571,439
Claims priority, application Japan Mar. 19, 1955
8 Claims. (Cl. 126—73)

The present invention relates to an improved furnace or stove for the continuous burning of coal.

More particularly, the invention relates to a downdraft furnace or stove which can also be effectively utilized for other purposes such as annealing, forging, hardening, quenching, and other heat treatments.

The invention, however, is especially related to a coal stove or furnace having superior coal burning qualities.

It is an important feature and object of the present invention to provide a furnace for the continuous burning of coal which is economical in operation as regards fuel consumption, one which completely consumes the fuel so as to eliminate production of smoke, and a furnace or stove which can be simply and effectively regulated as regards its heating capacities.

It is a particular object of the invention to provide a furnace or stove structure which includes outer wall means, a horizontal grate separating the interior into a lower ash pit or ash receiving portion, and an upper portion including interior partition means defining a coal receiving magazine or chamber, an air feeding chamber above the magazine, combustion chamber means, an adjustable damper means mounted to cover a major portion of the cross sectional area at the top of the magazine so as to provide controllable air flow into the top of the magazine through a narrow slot along the edge of the damper means, the partition means defining an air passage or duct providing air flow communication between the air feeding chamber and the ash pit portion, and a top cover over the air feeding chamber having an upper controllable damper means therein through which combustion supporting air can enter into the air feeding chamber with a limited amount flowing around the edge of the damper means above the magazine directly into the same and a further amount of air can flow through the duct or passage directly into the ash pit.

It is a further object of the invention to provide, in addition to the features set forth in the immediately aforegoing object, an air intake chamber disposed between the magazine and combustion chamber means and including an adjustable air inlet means to controllably admit air into the side of the air intake chamber, the partition means being constructed and arranged to provide communication between the side air intake chamber and the upper air feeding chamber so that proper manipulation of the respective air intake or inlet means and the adjustable damper means can effectively regulate the consumption of fuel to ensure complete combustion of the coal that has been introduced into the magazine.

Consistent with the foregoing objects, it is clear that air entering the magazine in the upper portion thereof may pass downwardly through the fuel bed and thence upwards toward an exhaust opening associated with the combustion chamber means, while air passing through said duct or passage passes into the ash pit and thence upwardly through the grate and fuel bed thereon to exhaust.

Further and more specific objects will be apparent from the following description when taken in connection with the accompanying drawings in which:

Figure 4 is a side view similar to Figure 1, but illustrating a modified furnace structure.

Figure 18 is a cross sectional view taken along lines 18—18 of Figure 16, Figure 19 is a front elevational view illustrating the vertical fire grate of Figures 16 to 18 as mounted on the front of the interior fire box shown in Figures 13 to 15, Figures 20, 21, and 22 are views, respectively, similar to Figures 10, 11, and 12, but illustrating the grate means of those figures combined with the interior fire box structure shown in Figures 13, 14, and 15.

In the drawings the same parts are denoted by similar reference characters.

Figure 1:
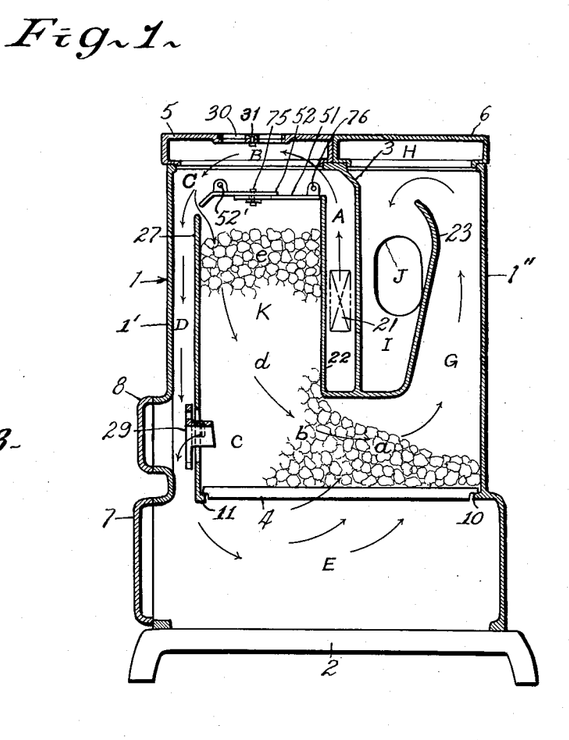
Figure 1 is a vertical, central, sectional view illustrating a furnace or stove constructed in accordance with the teaching of this invention and diagrammatically indicating the paths of air and gas flow through the furnace.

With particular reference to the stove or furnace illustrated in Figure 1, the exterior casing or wall means 1 extends upwardly from a base 2. The front wall 1' of the casing has a lower, normally closed ash pit door 7 and an inspection door 8 associated therewith. The inspection door 8 is utilized for inspecting and cleaning a horizontal grate 4 that is mounted on a ledge 10 extending across the interior of the rear wall 1'', and another ledge 11 extending across the interior of the vertical partition 27 that extends upwardly from the grate, is spaced from the front wall 1' and terminates beneath the top of the casing. Partition means 3 extend transversely across the space above the grate. The partition means include a rearmost, upwardly extending partition member 23 and another partition member 22 that respectively define a combustion chamber G at the rear of the casing, another combustion chamber portion I, and an air feeding chamber A. In addition, the partition member 27 cooperates in defining a magazine K. There is an exhaust opening J located above the bottom of the combustion chamber portion I and a side air inlet opening having controllable damper means, indicated diagrammatically at 21, is provided on the air feeding chamber A. The controllable damper means are particularly disclosed in Figures 4, 5, and 6.

The top of the casing is closed by two cover members 5 and 6. The cover member 5 that is above the magazine K is provided with an adjustable air inlet valve or damper means 30, similar to that shown in Figure 23. The removable component of this damper means can be turned about a vertical pin 31 so as to adjust the rate of air entering through the top. The cover member 6 closes the combustion chamber means G and I and, being hollow, provides an additional combustion chamber portion H. At the upper portion of the magazine K is an adjustable damper or baffle member including two relatively slidable plate members 51 and 52. These plate members are clearly illustrated in Figures 2 and 3, and are connected by a pin and slot connection including a pin 75. Hinge pins 76 are mounted on fixed brackets on the surface of plate member 51 for pivotally mounting the adjustable damper member to the interior of the side walls of the casing. The rear end of plate 51 is in contact with the upper part of partition 22, Figures 1 and 4, when the plate 51 is to be maintained in a horizontal position. As clearly shown in the drawings, the combined extent of plate members 51 and 52 covers a substantial or major portion of the cross sectional area at the top of the magazine K so as to define, with the under surface of the top cover 5, an upper air feed chamber B. The plate members 51 and 52 are adjusted so that a narrow slit provides communication between this air feeding chamber B and the top of the magazine adjacent the interior of the partition 27. Between the interior of the front wall 1' and the partition 27 is defined a vertical air duct D which is in direct communication with the ash pit. The fuel bed includes different portions influenced by the present invention and these portions are noted, respectively, at $a$, $b$, $c$, $d$, and $e$.

It is clear, therefore, that the furnace structure includes centrally arranged partition member 22, an intermediate partition 3 and a rearmost partition 23 which define the middle or side air feeding chamber A having its upper portion in communication with the upper air feeding chamber B, a high temperature combustion chamber G between the partition 23 and the rear wall 1'', a low temperature combustion chamber I in communication with the high temperature combustion chamber G through an upper combustion chamber H, and an exhaust outlet means J in communication with the chamber I. A portion of the heat energy of the exhaust gas is absorbed by the partition 3 and preheats air flowing in through the air feeding valve 21, described hereinafter.

Figures 4, 16, 17, 18, 19:
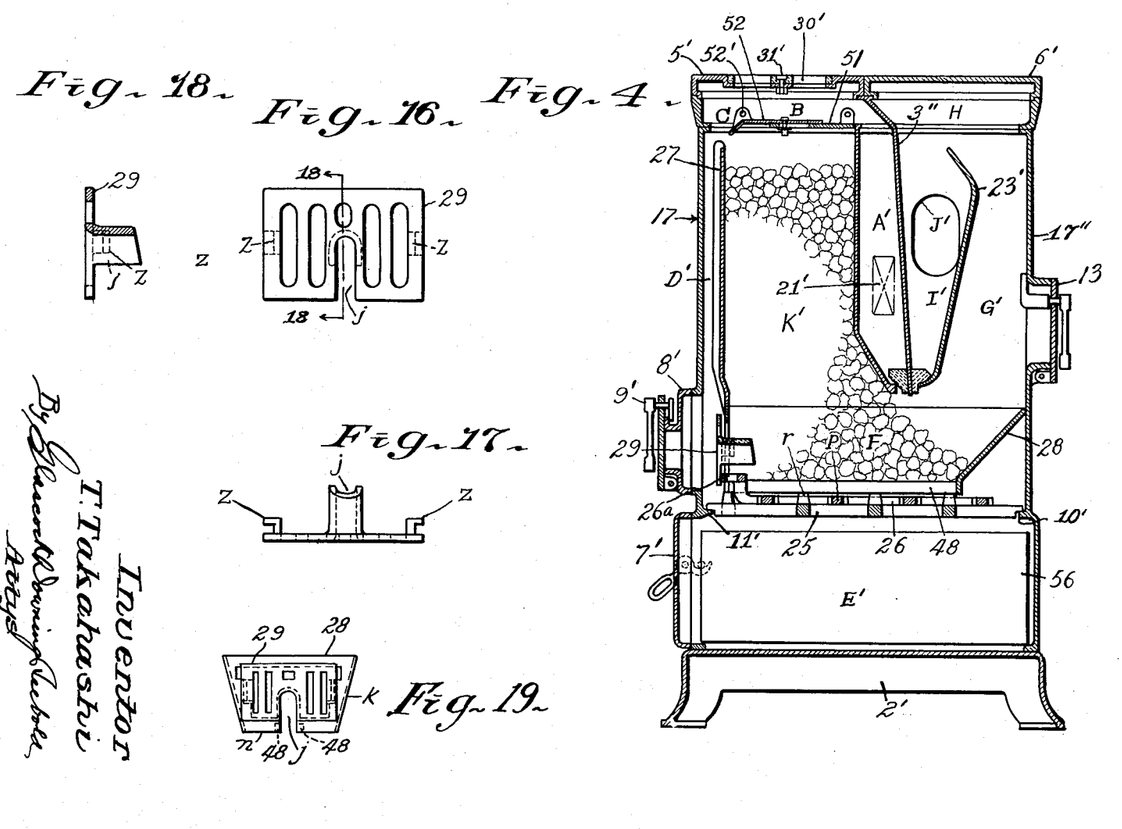
Figure 14:
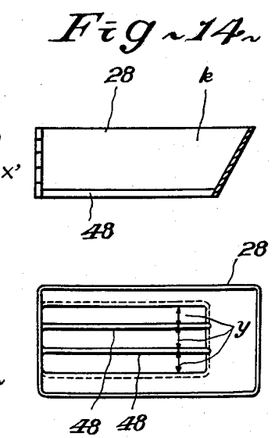
Figure 15:
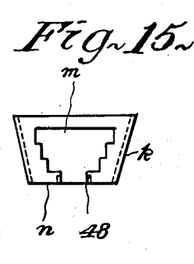

The stove or furnace shown in Figure 1 operates as follows:

The cover 5 is removed and the magazine K is charged with coal, while the adjustable damper means including the plates 51, 52 are pivoted open about the pins 76 by inserting the tip of a poker into the aperture of lug 52' that projects upwardly from plate 52. When the magazine is filled with coal so that some of it passes to the rear of the chamber and forms the coal bed $a$ the adjustable damper means at the top of the magazine are closed and the cover 5 is replaced. Next, the cover member 6 is opened and kindling coal is placed in the combustion chamber G to ignite the surface of coal bed $a$, following which the cover 6 is replaced and side air inlet means or valve 21 is fully opened. Now, assuming that the resistance to air passage flowing from the ash pit E up to chamber G through the fire grate 4 and coal beds $a$ and $b$ is relatively low, the following phenomena will occur. The draft action produced in combustion chamber I due to high temperature of the exhaust gas flowing through outlet J is first exerted in the ash pit E through the coal beds $a$ and $b$ through the grate and thence through air duct D, upper air feeding chamber B, and middle or side air feeding chamber A, successively. As a result, the air pressure in chamber A becomes lower than atmospheric and air is drawn in through the side air feeding valve 21 into the chamber A. The air drawn in in this manner, after passing through chamber B, is divided into a main stream and a branch stream at the area denoted at C between the top of the partition 27 and the edge of the upper baffle means at the top of the magazine. The main air stream flows down through the vertical air duct or passage D into the ash pit E, thence up into the fire grate 4 and into the fuel beds, so that combustion of coal on the grate will be supported by this air stream. The resulting combustion gas flows successively through high temperature combustion chamber G, upper combustion chamber H, low temperature combustion chamber I, and out the exhaust duct J. The branch air stream that flows through the narrow opening between partition 27 and the upper air baffle means enters into the top of the magazine K, flows downwardly therethrough, and thus through coal beds $e$, $d$, $c$, $b$, and $a$, chambers G and H, and thence out the exhaust duct J. A vertical grid 29, the details of which are disclosed in Figures 16 to 18, is supported in an opening in the partition 27 adjacent the coal bed $c$ by hook members Z in the same manner as disclosed with relation to the supporting of a grid 29 in an interior firebox 28 as shown in Figures 14, 15 and 19 because the opening in partition 27 is shaped to be identical with the opening $m$ in those figures. Thus it follows that a portion of the branch air stream which enters the top of the magazine is drawn out through this vertical grid and mixes with the main air stream flowing downwardly through duct or passage D. Due to the action of the main and branch air streams, the coal beds are successively burned. When coal beds $a$, $b$ and $c$ that are on the grate 4 are burned their ash accumulates on the grate and increases the resistance of air flowing through the grate. Accordingly, the main stream flowing through the air duct gradually reduces and the branch air stream passing directly into the top of the magazine around the edge of the upper baffle increases. Due to the action of this branch air stream, coal bed $d$ will gradually be burned and the conspicuous border surface between the lower burning coal bed and the upper non-burning coal bed gradually moves up so that eventually the uppermost coal bed $e$ will be completely consumed.

The air flowing upwardly through grate 4 acts as secondary combustion air for the consumption of coal beds $d$ and $e$.

That portion of the branch air stream which has flowed downwardly through the magazine and passes out through the vertical fire grid 29 acts to promote the combustion of coal bed $c$ and also to preheat the main air stream flowing downwardly through duct D. When the amount of air that is fed into the furnace through the side air inlet means with valve 21 open is insufficient to maintain combustion, additional air is directed into the upper air feeding chamber B, through upper air feeding valve means 30.

Figures 2, 3, 8, 9, 23:
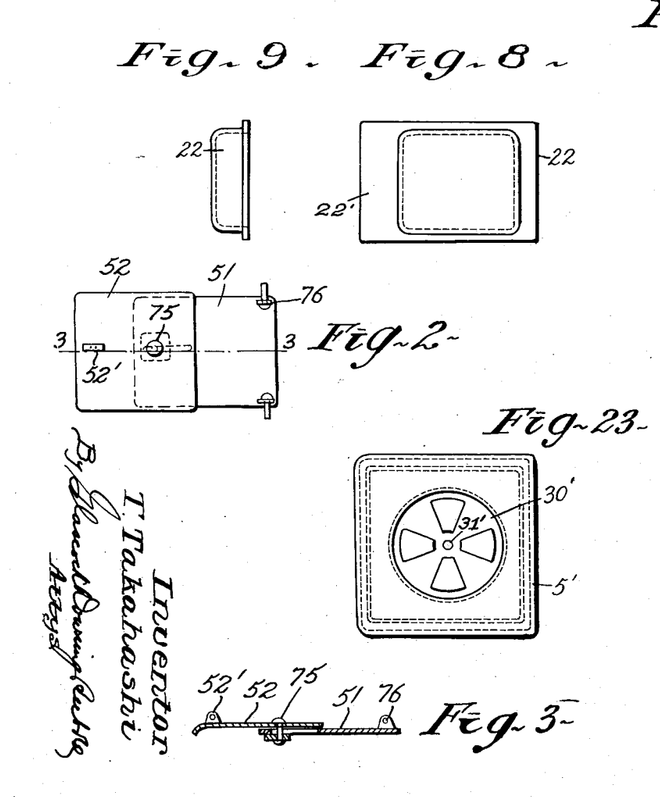
Figure 2 is a top plan view of the adjustable damper or baffle mounted at the top of the coal receiving magazine or chamber.
Figure 3 is a vertical sectional view taken along the line 3—3 of Figure 2.
Figure 8 is an elevational view of the movable damper part of the side air inlet means shown in Figure 5.
Figure 9 is an end elevational view of the damper shown in Figure 8, Figures 10, 11, and 12 are, respectively, a top plan view, a central vertical sectional view, and a front elevational view of the grate shown in Figure 4, Figures 13, 14, and 15 are, respectively, a top plan view, a central vertical sectional view, and a front elevational view of the interior fire box supported on the grate means in Figure 4, Figures 16 and 17 are, respectively, a front elevational view and a top plan view of the vertical fire grate shown in Figures 1 and 4.
Figure 23 is a top plan view of the cover member that surmounts the magazine, and illustrating the controllable damper or top air inlet means.

The opening between the edge of the plate 52 and the partition 27 can be controlled by adjusting plate 52 relative to plate 51. Accordingly, the adjustable baffle structure thus provided can be utilized to adjust the ratio of the main air stream and branch air stream in accordance with different grades of coal size and combustion conditions required. If this slot-like opening is successively increased, the branch air stream unnecessarily increases and the combustion progresses suddenly from coal bed $a$ to coal bed $e$ so that heat radiation is markedly different when coal beds $a$ and $b$ are principally burning than when coal beds $d$ and $e$ are so burning. Due to this difference it would become difficult to provide that there is uniform heat radiation over a long period of time. Furthermore, the ash in coal bed portion e would cover the non-burning coal in the bed portion d because of more rapid combustion of coal in bed portion e than in bed portion d, and thereby the effective combustion of the coal bed portion under the bed portion d will be disturbed. By suitably controlling the size of the narrow opening between the partition 27 and the plate 52 it is possible to consume the coal bed portions a, b, c, d, and e successively, with the required consistent speed, from the lower bed portions upwardly to the upper bed portion. In addition, the border surface between the high temperature combustion part or principally burning coal and the low temperature or non-principally burning coal is conspicuously established within the magazine so that the amount of coal which is producing gas reduces and the ability to control combustion by manipulation of valves 21 and 30 is facilitated. In this manner it is possible to continue to provide uniform heat radiation, even in instances when air intake adjustment has not been effected, for a long period of time from the starting of combustion to the completion thereof. Since an incessant downward air flow is established through magazine K, coal gas produced from the coal has no opportunity to remain in the magazine so that explosive combustion in the magazine is prevented. Moreover, it would be possible to eliminate a particular treatment for removing ash during combustion since preheating of each coal bed portion is always progressively effected and the slight smoke once produced will be completely burned during passage through incandescent coke beds. Thereby combustion gas passing through exhaust duct J contains no smoke. Thus, due to the continuation of moderate combustion, excess air reduces and the combustion temperature is raised resulting in the complete combustion of fuel and an increase in thermal efficiency. The air flowing through the middle air feeding chamber A is preheated by contact with the partition 3 so that the state of combustion and thermal efficiency is further improved.

It is further to be pointed out that the furnace or stove of the present invention has very favorable results, even when using fuel other than coal, such as wood, coke, briquetted fuel, lignite and charcoal. Additionally, coal which can be termed caking bituminous coal can be used and still produce good results.

It is also to be pointed out that the furnace or stove is operative when the combustion supporting air is supplied mainly only through the upper air feeding valve 30 that is provided in the top cover 5.

Figures 5, 6, 7:
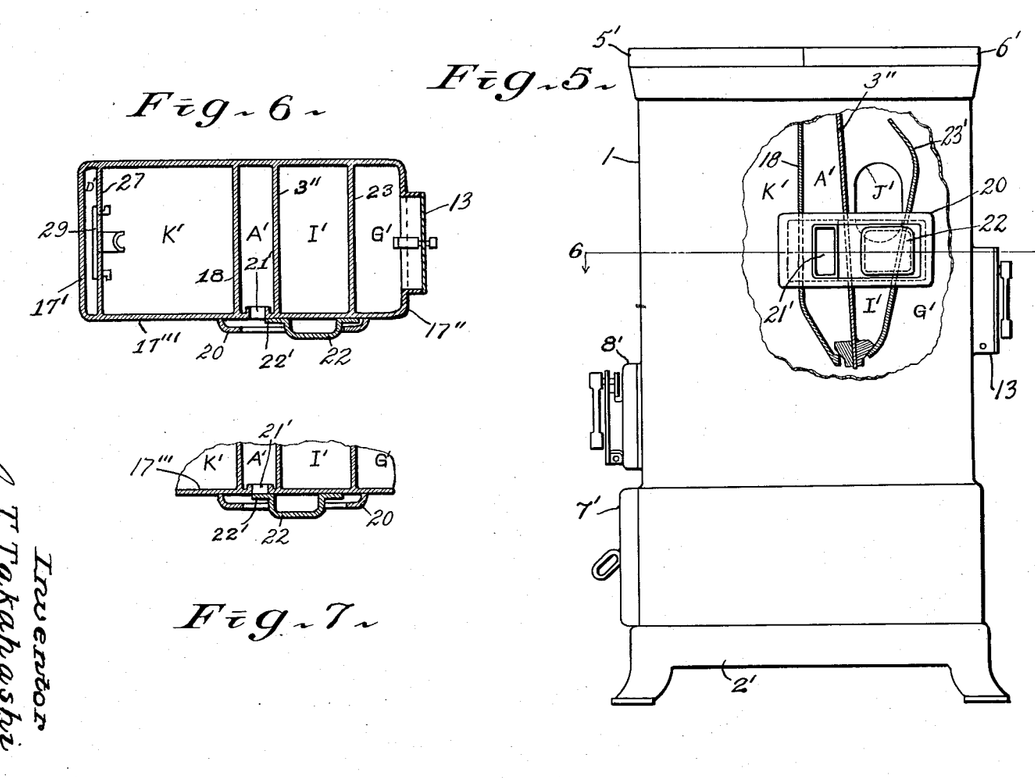
Figure 5 is a side elevational view, partly broken away and partly in section, illustrating the controllable side air inlet means as applied to the furnace of Figure 4.
Figure 6 is a horizontal cross sectional view taken along lines 6—6 of Figure 5 and illustrating the side air inlet means in open position.
Figure 7 is a fragmentary horizontal cross sectional view similar to Figure 6, but illustrating the side air inlet means in closed position.

A slightly modified structure of the stove just described is particularly illustrated in Figures 4 and 5. Figures 5 to 9 illustrate the side air feeding valve that is denoted diagrammatically at 21 and 21' in Figures 1 and 4 respectively. The stove illustrated in these figures includes an outer casing structure denoted at 17, including a front wall 17' and a rear wall 17". The base of the stove 2' is surmounted by the ash pit area E' over which is a horizontal grate structure described in more detail hereinafter. The front wall is provided with an ash pit door 7' and an inspection door 8' which has a separate door or cover 9' associated therewith for a purpose described hereinafter. The interior of the stove in the area above the grate means is provided with the partition 27 defining the air duct or passage D' and additional partition means including a central partition member 3", a rearmost partition member 23' and a front partition member 18. The several partition members in combination with the front and rear walls define the magazine K', the several combustion chambers G', H, I' and the middle air feeding chamber A'. Above the magazine is the adjustable baffle means consisting of the plate members 51 and 52, as shown in Figure 1. Top covers 5' and 6' seat on the top of the casing and a top air feeding valve 30' is mounted in the top cover 5' to turn about pin 31'. The appearance of this valve is shown in plan in Figure 23.

The side air feeding valve includes an opening denoted at 21', Figures 4 to 7, that is formed in the side wall 17''' of the casing. This opening 21' is controlled by a slidable damper plate 22 mounted to slide in a frame portion 20. The damper plate includes a flat end portion 22' that opens and closes the opening 21', as particularly illustrated in Figures 6 and 7, respectively. An outlet J' is in communication with the upper portion of combustion chamber I'. A latch equipped ignition door 13 is provided, as shown in Figures 4 and 6, to be opened in lieu of cover 6' only when kindling fuel is to be placed on the coal bed to start combustion.

The stove construction of Figures 4 to 9 is improved by the utilization of a compound grate means in lieu of a single horizontal fire grate such as shown at 4 in Figure 1. The grate means illustrated in Figure 4 and as specifically shown in Figures 10 to 12, includes a horizontal grate member 25 provided with front and rear protruding supporting arms f and g which respectively bear on ledges 10' on the interior of the rear wall of the furnace and 11' provided on the interior of the front wall of the furnace beneath the inspection door opening. A frame-shaped slidable shaker plate 26 is supported on top of the grate member 25 for limited horizontal movement. The horizontal grate 25 is provided with four rows of vertically extending projections r, each projection being longer than the thickness of the shaker plate 26, so that fire box 28 referred to hereinafter is supported on the tops of the projections. The rows extend transversely of the major axis of the grate member in the direction indicated by line Y—Y' which is perpendicular to the longitudinal axis of the grate means denoted by the line X—X'. The grate member 25 includes longitudinal beams q extending parallel to the longitudinal axis and the projections of each row are equally spaced from one another. Further, the rows are equally spaced from one another in a direction X—X'.

Figure 10:
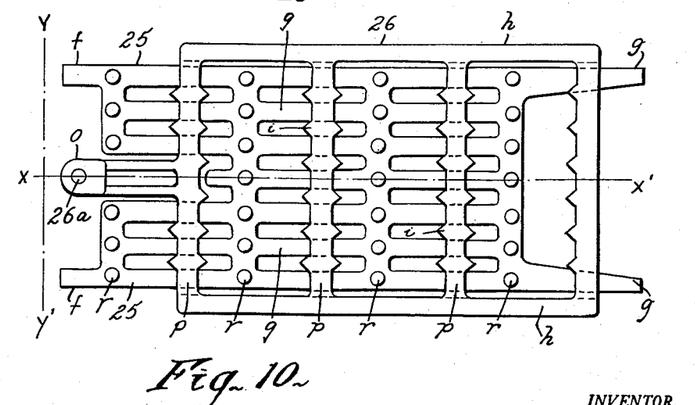
Figures 11, 12:
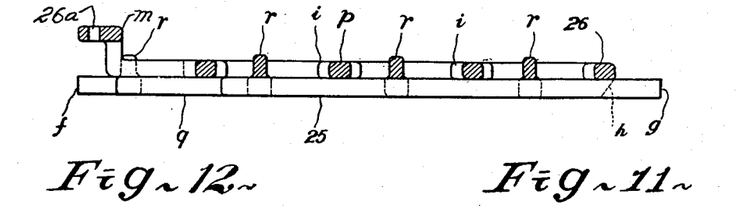

The slidable plate 26 includes two parallel side beams h and four cross bars p. At the front end of the furnace the slidable plate is provided with a projecting portion o having an opening 26a therein. The distance between the respective cross beams or bars p is equal to that between two adjacent rows of projections r on the grate 25. Further, the cross bars p have oppositely directed aligned projections i so spaced that when the plate or frame member 26 is moved longitudinally of the grate the projections will pass into the space between adjacent projections r.

Figure 13:
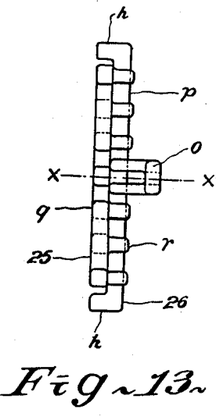
Figure 20:
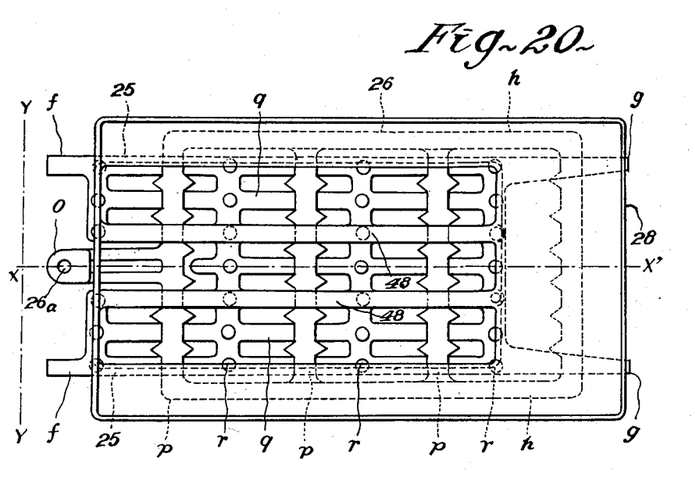
Figure 21:
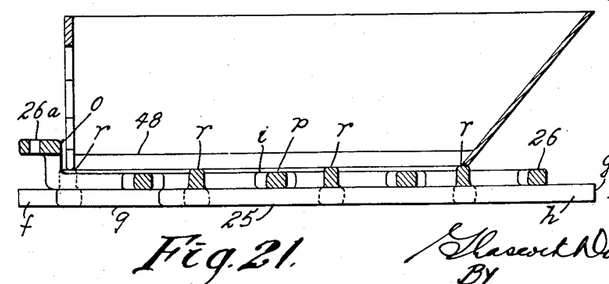
Figure 22:
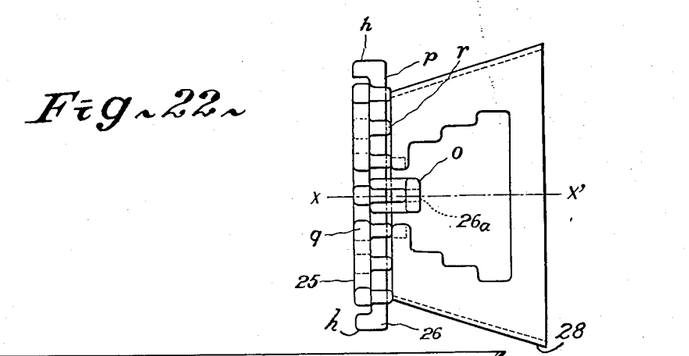

In addition to the aforedescribed grate structure, the furnace is also provided with an interior fire box 28 illustrated in Figures 13 to 15. The fire box is mounted on the grate structure and includes an outer wall k having an opening m in the front thereof, a partial bottom structure n and two parallel longitudinally extending beams 48 arranged on the bottom. As further shown in Figures 20 to 22, the interior fire box is funnel-shaped and its bottom edges and the beams 48 rest on the top of the projections r. In addition, as is clear from Figure 4, the upper rim of the fire box is dimensioned so that it contacts the interior wall structure of the casing. The distances y shown in Figure 13 are selected to be twice the distance between two adjacent longitudinal beams q, shown in Figure 10. When the interior fire box 28 is utilized it is preferred to use a vertical grid structure as shown at 29 in Figures 16 to 18. The grid 29 is formed with a central vertically extending slot j and a rearwardly extending boss surrounds at least the major portion of the slot j. The vertical grid 29 is provided with hook members z which mount the grate within the opening m of the fire box. The slot j serves the purpose of accommodating a poker which is passed through cover 9' when it is open and placed in aperture 26a of plate 26 for sliding the same when shaking down ashes, as explained hereinafter. Figures 20 to 22 illustrate the fire box 28 mounted on the grade member.

Since the longitudinal beams 48 on the interior bottom of the fire box are spaced so that the distance $y$ between the respective beams and between the beams and the adjacent wall at the bottom of the box is twice the distance between the center lines of two adjacent longitudinal beams $q$ of grate 25, the majority of large pieces of coal charged into the magazine K' are supported by only the side walls $k$ of the interior of the fire box and the longitudinal beams 48. Only small pieces of coal are supported on the upper surface of grate 25, cross bars $p$ of the slidable shaker plate 26, and the columns $r$ of grate 25.

In the operation of the modification just described, the air is drawn in through the middle air feeding chamber A' and through the side air inlet opening 21' when damper member 22 is opened. The air passes upwards to the air feeding chamber B, thence downwardly through duct D' and to magazine K' around the edge of plate 52. A part of the air that flows down through the coal beds in the magazine passes out through vertical grid 29 and this air, together with that flowing through duct D', passes into the ash pit E', thence up through the grate 25, shaker plate 26, cross beams 48, and into the coal bed thereabove, so that the coal bed portion is supported within the fire box and on the grate and shaker plate structure and will be subjected to combustion. A portion of the air that passes through the magazine and flows through the coal bed mixes with the air flowing upwardly through the coals. With progressive burning of the coal beds the coal supported by the grate structure gradually becomes ash or cinders. The accumulation of ash on the grate structure gradually increases a resistance to air flow through the grate. When cover 9' is opened and shaker plate 26 is moved longitudinally back and forth by a poker the lateral projections $i$ on the cross bars $p$ of shaker plate 26 crush ashes between adjacent projections $r$ so that they are small enough to fall down through the openings between the beams $q$ of the grate 25. In this fashion the removal of ash decreases the resistance to air flow.

Since small coal particles burn down more rapidly than large particles a large weight of coal in the magazine K' is supported mainly by the side walls $k$ of the interior fire box 28 and the cross beams 48 on the bottom of the fire box when the ash or cinder that is in the path of movement of cross bars $p$ is moved by shaking action. During the shaking operation when the shaker plate is reciprocated slightly shocks are transmitted to the interior fire box, including the longitudinal beams 48, through impact of the cross bars $p$ against columns $r$. These shocks are transmitted to all of the overlying coal beds in the magazine K', whereby ash films surrounding incandescent coal particles are slipped off to form ash powder which drops down into the ash pit after passing through the lower coal beds and the grate 25. In this manner incandescent coals will readily be exposed by the stripping off of ash films so as to promote oxidation whereby an excess of air and combustion gas is reduced and gaps between incandescent coal particles are increased so as to facilitate the downward passage of the air stream that enters the top of the magazine K'. Accordingly, the continuous combustion for a long period of time may be observed even when the coal beds in the magazine K' are left in their original position and the combustion temperature and thermal efficiency will be substantially improved.

According to the constructional form of furnace shown in Figure 4, even though the length of air passage in the stove is particularly long, the total resistance to its passage is quite large due to the curved portions, since the resistance to air flow in the grate and coal beds can be reduced by a shaking action it is possible to supply sufficient air into the coal beds to provide for strong and continuous combustion for a long period of time. When cinders or ash are to be removed after complete combustion of the coal beds, the shaker plate 26 is reciprocated with the cover 9' open so that cinders on the inside of the fire box and magazine chamber are successively crushed and dropped down into the ash pit E'. In this instance, an ash pan 56 can be placed in the ash pit E' to facilitate removal of ash and prevent dispersion of the ash powder.

Furthermore, the longevity of the stove can be increased by manufacturing the longitudinal beams 48 of the interior fire box of a heat-resistive material. The horizontal grate 25 and shaker plate 26 can be made from cast iron. Additionally, with the utilization of the interior fire box 28 prominent combustion is effected in that area directly above the grate 25 surrounded by the inclined walls of the fire box, which thus define a funnel-shaped combustion chamber. Utilization of the interior fire box contains the following advantages when compared with the usual stove or furnace without such fire box:

(a) The effective area of the grate is relatively narrow in comparison with the cross sectional area of the interior of the stove casing, so that the air velocity passing through the effective area is large due to contraction of the air path in passing through the grate whereby the combustion of incandescent coals in coal beds $a$, $b$, and $c$ is effectively promoted, and mixing of the air with non-burning gas is carried out with such efficiency as to raise the combustion temperature in the interior of the fire box.

(b) The interior wall of the fire box cooperates with the interior of the casing to form a double wall structure so that heat radiation from that area of the stove is so reduced as to promote a temperature rise in the interior of the fire box, while this radiated heat will pass off from the surface of the combustion chamber G' following rapid completion of combustion in the fire box. It follows that excess air is reduced and carbon dioxide contained in the exhaust gas is increased, thereby the thermal efficiency increases and no smoke is discharged from the chimney.

In general, coal is most economical as a fuel for a stove. Its sphere of utilization, however, has gradually been limited because the floor area around the stove and the ambient atmosphere are apt to become soiled and dirty due to coal dust, ash particles, and the like. Additionally, the regulation of coal burning stoves is relatively complicated.

Accordingly, in cold regions, coal stoves are very often replaced by wood burning stoves, and recently electric heaters and gas and oil burning furnaces and stoves have been utilized as a source of heat.

The disadvantages of prior art coal burning stoves have been eliminated by the present invention.

The combustion chambers illustrated in Figures 1 and 4 can be utilized as a convenient furnace area suitable for any heat treating of metals if a pyrometer is associated therewith, because the sensitive regulation of the temperature in these chambers can readily be attained by manipulating air valves 21 and 30.

While the essential difference between the embodiment of Figure 1 and that of Figure 4 is directed to the grate and fire box structure, the partition means of Figure 4 could obviously be constructed identical with that of Figure 1 and vice versa.

While I have described in connection with particular embodiments of my invention, it will, of course, be understood that I do not wish to be limited thereto, since many modifications may be made and I therefore contemplate by the appended claims to cover all such modifications as fall within the true spirit and scope of my invention.

I claim:

1. A furnace for the continuous burning of fuel comprising in combination, wall means defining a casing, a horizontal grate means within the casing dividing the same into a lower ash-receiving portion and an upper fuel-consumption portion, an open-ended fuel-receiving magazine extending above the grate means, a top cover means on the casing and spaced above the upper end of the magazine, a baffle means mounted at the top of the magazine and adapted to cover a major portion of the cross sectional area at the top of the magazine, the space between the top cover means and the baffle means constituting an upper air feeding chamber, said magazine including one wall spaced from an adjacent casing wall so as to define an air passage between the interior of the casing and the exterior of the magazine in constant communication with the lower ash receiving portion and the upper air feeding chamber, said baffle means having at least one edge spaced from the adjacent end of the magazine whereby a limited quantity of air can flow from the upper air feeding chamber directly into the top of the magazine around said edge, and an adjustable air inlet valve means in the top cover means above the magazine through which a regulable quantity of air can be drawn into the upper air feeding chamber for passing into and through said magazine and air passage, respectively.

2. A furnace for the continuous burning of fuel comprising in combination, wall means defining a casing, a horizontal grate means within the casing dividing the same into a lower ash-receiving portion and an upper fuel-consumption portion, an open-ended fuel-receiving magazine extending above the grate means, a top cover means on the casing and spaced above the upper end of the magazine, a baffle means mounted at the top of the magazine and adapted to cover a major portion of the cross sectional area at the top of the magazine, the space between the top cover means and the baffle means constituting an upper air feeding chamber, said magazine including one wall spaced from an adjacent casing wall so as to define an air passage between the interior of the casing and the exterior of the magazine in constant communication with the lower ash-receiving portion and the upper air feeding chamber, said baffle means having at least one edge spaced from the adjacent end of the magazine whereby a limited quantity of air can flow from the upper air feeding chamber directly into the top of the magazine around said edge, adjustable air inlet valve means in the top cover means above the magazine through which a regulable quantity of air can be drawn into the upper air feeding chamber for flowing into and through said magazine and air passage, respectively, partition means in the casing defining a middle air feeding chamber adjacent the magazine in communication with the upper air feeding chamber and combustion chamber means spaced from the magazine by said middle chamber, and a side air inlet means in communication with said middle air feeding chamber including a controllable valve member through which a regulable quantity of air can be drawn into said middle air feeding chamber.

3. A furnace for the continuous burning of fuel comprising in combination, wall means defining a casing, a horizontal grate means within the casing dividing the same into a lower ash-receiving portion and an upper fuel-consumption portion, an open-ended fuel-receiving magazine extending above the grate means, a top cover means on the casing and spaced above the upper end of the magazine, an adjustable baffle means mounted at the top of the magazine and adapted to cover a major portion of the cross sectional area at the top of the magazine, the space between the top cover means and the baffle means constituting an upper air feeding chamber, said magazine including one wall spaced from an adjacent casing wall so as to define an air passage between the interior of the casing and the exterior of the magazine in constant communication with the lower ash-receiving portion and the upper air feeding chamber, said baffle means having at least one edge spaced from the adjacent end of the magazine whereby a limited quantity of air can flow from the upper air feeding chamber directly into the top of the magazine around said edge, said adjustable baffle means comprising upper and lower plate members connected for relative horizontal movement so as to vary and control the amount of air flowing from the upper air feeding chamber around the baffle means and into the upper end of the magazine, adjustable air inlet valve means in the top cover means above the magazine through which a regulable quantity of air can be drawn into the upper air feeding chamber for flowing into and through said magazine and air passage, respectively, partition means in the casing defining a middle air feeding chamber adjacent the magazine in communication with the upper air feeding chamber and combustion chamber means spaced from the magazine by said middle chamber, and a side air inlet means in communication with said middle air feeding chamber including a controllable valve member through which a regulable quantity of air can be drawn into said middle air feeding chamber.

4. A furnace for the continuous burning of fuel comprising in combination, wall means defining a casing, a horizontal grate means within the casing dividing the same into a lower ash-receiving portion and an upper fuel-consumption portion, an open-ended fuel-receiving magazine extending above the grate means and adjacent one end of the casing, combustion chamber means behind the magazine having an exhaust opening communicating therewith, a top cover means on the casing and spaced above the upper end of the magazine, a baffle means mounted at the top of the magazine and adapted to cover a major portion of the cross sectional area at the top of the magazine, the space between the top cover means and the baffle means constituting an upper air feeding chamber, said magazine including one wall spaced from an adjacent casing wall so as to define an air passage between the interior of the casing and the exterior of the magazine in constant communication with the lower ash-receiving portion and the upper air feeding chamber, said baffle means having at least one edge spaced from the adjacent end of the magazine whereby a limited quantity of air can flow from the upper air feeding chamber directly into the top of the magazine around said edge, and adjustable air inlet valve means in the top cover means above the magazine through which a regulable quantity of air can be drawn into the upper air feeding chamber for passing into and through said magazine and air passage, respectively, and thence through the fuel on the grate means to exhaust.

5. In a downdraft type magazine stove of the type including a horizontal grate means separating the stove into upper and lower portions, the improvements comprising a vertically extending open-ended magazine above the grate means and having less dimensions than the interior of the stove in one direction only, said magazine terminating beneath the top of the stove, a top cover means above the magazine and at the top of the stove, a baffle means at the upper end of the magazine and covering a substantial part of the cross sectional area of the upper end of the magazine and including an edge disposed adjacent to and spaced from the adjacent edge of the magazine, said magazine being adjacent the front of the stove but spaced from the interior thereof to define an open-ended passage in constant communication with the portion of the stove beneath the grate and the space above the magazine and beneath the top cover means, means for controllably admitting air into the space above the baffle means, combustion chamber means on the rear side of the magazine and having an exhaust opening in communication therewith and said combustion chamber having a reclosable opening for the introduction of kindling material whereby with the cover removed, the magazine charged with fuel, the fuel ignited and the top cover means closed the admission of air into the space above the magazine establishes draft conditions through the stove with a portion of the air flowing around the baffle means and directly into the top of the magazine, thence through the fuel to the exhaust opening and another portion of the air flowing directly past the magazine to the space below the grate and thence upwardly through the fuel to the exhaust opening to facilitate progressive consumption of fuel on the grate and in the magazine.

6. A downdraft magazine stove as claimed in claim 5, in which said baffle means comprises superposed plate members connected for relative movement with respect to one another so as to vary the size of the opening through which air can flow directly into the top of the magazine.

7. A downdraft type magazine stove as claimed in claim 5, in which partition means extend transversely of the stove at the rear of the magazine to define a middle air feeding chamber adjacent the magazine and in communication with the space above the magazine and combustion chambers between the magazine and the rear of the stove in communication with one another, and the means for controllably admitting air into the space above the magazine including controllable valve means operatively associated with the middle air feeding chamber.

8. A downdraft magazine stove as claimed in claim 5, said baffle means comprising superposed plate members connected for relative movement with respect to one another so as to vary the size of the opening through which air can flow directly into the top of the magazine and the means for controllably admitting air into the space above the magazine also including controllable valve means operatively associated with the top cover means.

References Cited in the file of this patent

UNITED STATES PATENTS

| | | |
|---|---|---|
| Re. 23,319 | Sanford et al. | Jan. 2, 1951 |
| 1,561,497 | Wier | Nov. 17, 1925 |
| 2,564,713 | Miles | Aug. 21, 1951 |

FOREIGN PATENTS

| | | |
|---|---|---|
| 585,289 | Germany | Sept. 30, 1933 |